Patented Oct. 7, 1930

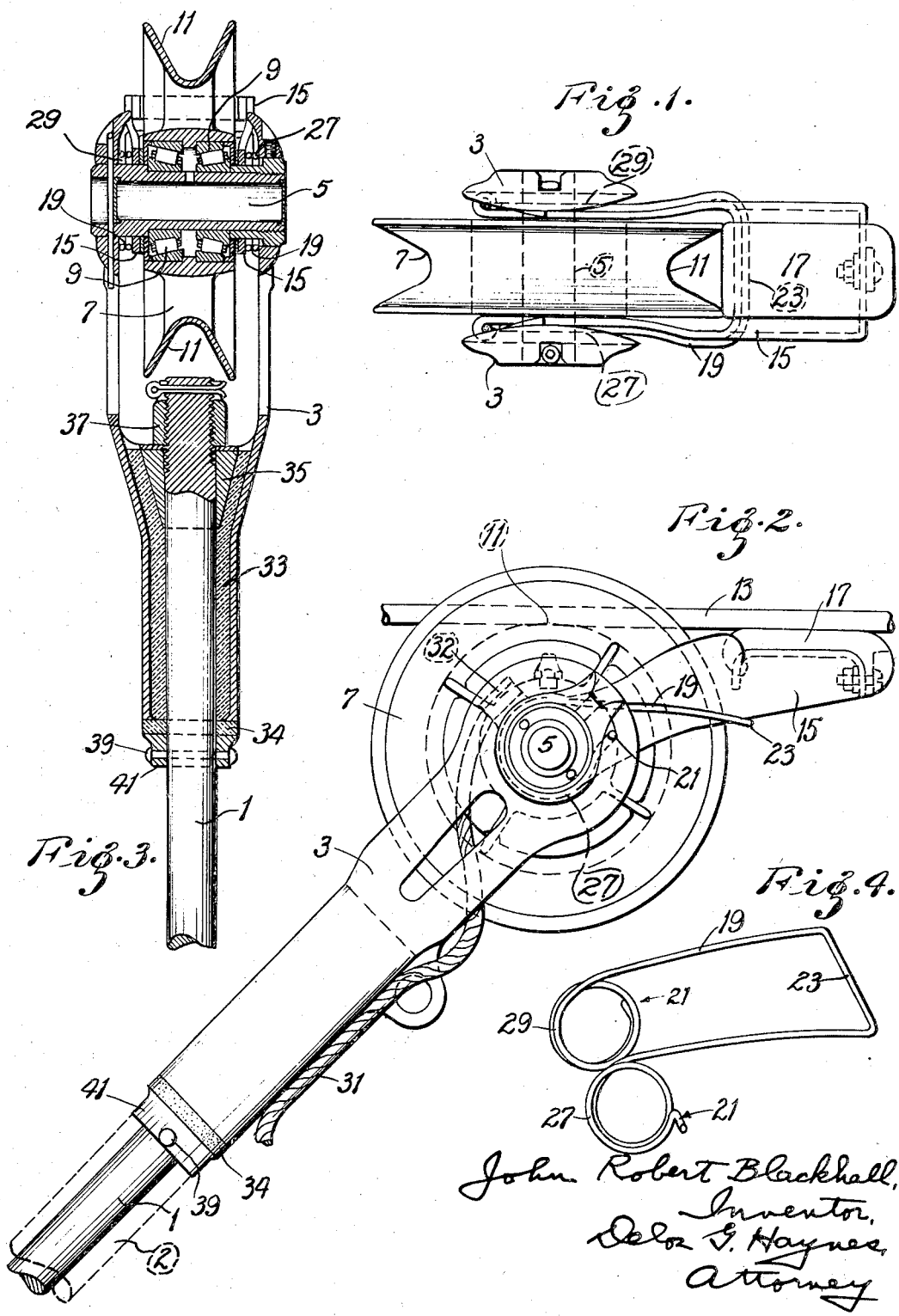

1,777,955

UNITED STATES PATENT OFFICE

JOHN ROBERT BLACKHALL, OF HIGHWOOD, ILLINOIS

TROLLEY COLLECTOR

Application filed July 2, 1927, Serial No. 203,012. Renewed February 26, 1930.

This invention relates to trolley collectors, and with regard to certain more specific features, to a collector comprising the combination of a trolley wheel and a trolley shoe.

Among the several objects of the invention may be noted the provision of means for obtaining increased electrical contacting area at lower pressures without arcing; the provision of a low pressure contactor which is positively guided in its movement along the trolley and which will positively remain in contact with the trolley wire, even though the trolley wheel leaves the wire at hangers when traveling at high speeds; the provision of apparatus of the class described which is adapted to reduce wear on the trolley wire, the trolley wheel and the shoe; the provision of apparatus of the class described which is adapted to reduce the noise commonly associated with this type of apparatus; the provision of apparatus of the class described which is adapted to permit the trolley-wheel and its attached pieces to rotate about a longitudinal axis through an angle on the trolley pole; the provision of a collector having renewable contactor elements and the provision of a device of the class described which may be economically manufactured, and which has a low cost of upkeep. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a plan view of the collector;

Fig. 2 is a side elevation thereof, showing a trolley wire;

Fig. 3 is an end elevation thereof partially in section; and,

Fig. 4 is a perspective view of one form of spring used.

Corresponding reference characters indicate corresponding parts throughout the several views of the drawings.

Referring now more particularly to the drawings, in Figs. 1 to 3, there is illustrated at numeral 1 part of a trolley pole made of aluminum alloy, surmounted by a harp 3 made of the same material. The part 1 of the trolley pole comprises a pin which extends into the pole 2, proper (shown in dotted lines in Fig. 2). The part or pin 1 extends from the pole 2 and forms a part thereof. The harp 3 carries a hollow pin 5, upon which is rotatably mounted a trolley wheel 7. The wheel 7 is preferably mounted on the pin 5 by means of a roller or other similar anti-friction bearing 9, it being possible to use this refined type of bearing in view of the invention described herewith. The trolley wheel 7 is grooved at 11 to engage and track upon the trolley wire 13, shown only in Fig. 2.

Pivoted on the pin 5 is an oscillable clevis 15 which reaches rearwardly of the wheel 7, said clevis being composed of aluminum alloy, copper, bronze or other conducting metal. This clevis 15 is provided with a detachable shoe 17 composed preferably of a substantially non-wearing, conducting metal and having a substantial bearing area on the trolley wire, directly behind the trolley wheel. The geometric relationship between the surface of the detachable shoe 17 and the bottom of the groove 11 is tangential, so that the shoe has contact with the wire along its whole length, regardless of the angle which the trolley pole 2 has with respect to the wire 13. This relationship is a constant one, because the clevis 15 is pinned around the center about which the wheel 7 rotates.

In order at all times to maintain contact between the detachable shoe 17 and the trolley wire 13, there is provided a wire spring 19 reacting from junctures 21 at its ends with the harp 3 against the bottom of said clevis 15 at 23. The fastenings or junctures 21 comprise recesses into which the bent ends of the spring wire are inserted.

The spring 19 is shown in greater detail in Fig. 4. Referring to this figure, it is seen that spring 19 constitutes a piece of spring-wire bent in the form shown so that two coils, 27 and 29 are formed. Said coils 27 and 29 provide the reaction between the harp 3 and the clevis 15. Said coils 27 and 29 in the assembled device take a position between the harp 3 and trolley wheel 7 as shown in Figs. 2 and 3. Under normal running conditions, the spring 19 is deformed an amount adapted to give about three or four pounds pressure between the shoe and the trolley wire. This pressure is considerably less than the pressure between the wheel 7 and said trolley wire, the wheel pressure being due to the conventional trolley stand spring which holds up the trolley pole. The trolley stand and spring is not shown in the present drawings, it being located near the car roof. The pressure between the wheel and the wire in the present embodiment is equal to that in the conventional trolley construction, namely, about thirty-five pounds.

A woven copper conducting wire shunt or pigtail 31 is used between the clevis 15 and the pole 2 in order to transmit the current flow, since rubber layers 33 and 34, to be described, prevent the harp from having direct contact with said trolley-pole. The pigtail is fastened to the clevis at one or more of a pair of rolled sockets 32, forged with the clevis.

In this invention the harp 3 is not connected directly to the trolley pole 2, but a layer of rubber 33 and a rubber washer 34 are interposed. The rubber layers, in effect, interpose a resilient or absorbent pad or cushion between the harp and the pole which will take up shocks and vibrations and in addition will permit of some rotative movement of the harp upon the trolley-pole or pin. The harp is preferably secured to the pin 1 (to which the pole 2 is fastened) by rivets and a wedge-shaped or conical sleeve 35 and a nut 37. In addition, the pin 39 is driven through the collar 41 and pin 1 to prevent the harp 3 from moving down on the trolley pole 2.

By the use of this invention, it is possible to retain all of the advantages of a trolley wheel for following trolley wires, combining therewith all of the advantages of a low-pressure sliding contact for collecting current.

Heretofore, a trolley wheel was used, or a shoe. The wheel had small contact with high speeds and was therefore burned and pitted. Furthermore, it was made of soft, conducting material and wore fast. By means of the present invention the wheel is relieved of its conducting function and may therefore be made of hard steel, thus reducing wear. Also, by being relieved of the conducting function, the pitting is reduced. Pitting occurred when the wheel intermittently left the trolley wire at high speeds.

In the constructions which used a shoe only, the wear was excessive because of the high friction, due to high contact pressure required for maintaining the shoe on the wire.

In the present invention, the wheel (which is loaded with thirty-five pounds or so of pressure for maintaining mechanical contact) may be manufactured with only wear-resisting requirements in view. The improved wear-resisting roller bearing 9 may be used, which ordinarily would not carry a large current. No burning is had and thus the contour of the wheel is preserved. The wheel acts as a guide only.

On the other hand, the light contact pressure of the shoe reduces wear and yet provides for ample current transmission at the increased contacting area. The current is better transmitted than if it were only transmitted through the wheel, because the wheel has only a small contact area.

It is evident from the geometric construction, that the shoe maintains its original longitudinal contact regardless of the angular relationship between the pole 2 and the trolley 13. The shoe maintains contact with the wire when the wheel jumps from the trolley in passing hangers at high speeds.

As illustrated in the side elevations, the shoe 17 is formed downwardly at the rear thereof, thereby making it possible to readily back a car.

It is to be understood that, if desired, the spring 19 may have a different construction than that shown, so long as it fulfills its function of maintaining the shoe 17 pressed against the trolley wire 13.

The rubber layer 33 and washer 34 absorb vibrations from the wheel and shoe in contact with the wire and prevent vibration from being carried through the pole to the roof of the car, thereby eliminating some of the noises prevalent in cars equipped with the standard type of trolley collector and pole. In addition, they permit a slight twisting of harp 3 on trolley-pole 2 when the trolley wheel 11 is following the trolley wire 13 around a curve. Under present conditions, trolley wires on curves have to be renewed several times during the life of trolley wires over straight track. This twisting action to an appreciable extent decreases the wear on the trolley wire and decreases renewals. It also reduces wear on the trolley wheels.

By the use of strong aluminum alloy, the weight of trolley pole, harp and trolley base is reduced to approximately one-third of their weight with steel construction. This makes a corresponding reduction in the inertia of the movable trolley pole and trolley harp, thereby allowing a reduction in the trolley base spring tension necessary to maintain contact between the trolley pole and trolley wire. This reduction in tension permits a reduction in size and corresponding reduction in weight of the tension springs in the trolley base.

It will be seen from the above that there is effected a combination wherein the current collector is secured to the trolley pole with interposed, resilient means between the securing means for the collector and the pole. The trolley device in effect comprises three concentrically located parts, comprising the pole, harp and insulator, the pole and the harp being of metal and adapted to be shifted out of alignment under stress. In effect the rigid members comprising the pole and harp extend in the same direction and have a common axis and overlapping spaced surfaces with a tubular body 33 of elastic material engaging the surfaces under compression to yieldingly hold the members in alignment.

Another point to be noted is that as force increases tending to separate the trolley pole and the harp, the resilient material 33 increasingly resists the separation.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The trolley collector comprising a trolley pole, a harp mounted on said pole, a resilient layer interposed between the harp and the pole and wedging means for holding the said harp and layer to the pole.

2. The trolley collector comprising a trolley pole, a harp, resilient means for mounting said harp on said pole, said means comprising a cylindrically shaped piece of rubber interposed between a portion of the harp and a portion of said pole, said piece having a tapering portion and a tapering member movable with respect to the pole, and adapted to force the said tapering portion to hold the harp.

3. The combination of a trolley pole, a current collector, means to secure the collector to the pole and a resilient means interposed between the pole and securing means to insulate the trolley pole from sound vibrations and electric current passing from the collector to the pole.

4. The combination of a trolley pole, a current collector and a support therefor and a non-conductor of sound separating the pole and support and retaining them in fixed electrically insulated relation.

5. The combination with a trolley pole to be secured at one end to a trolley base, a current collector and a support therefor of a non-conductor of sound to hold the parts in separated relation and prevent their separation in a longitudinal direction and prevent sound being transmitted to the base.

6. A trolley device comprising three concentrically arranged parts having their longitudinal axes coinciding, two of the parts being of metal separated and insulated electrically by the third part of resilient and electrically insulating material, allowing the axes of the two parts to shift out of relative alinement under stress and attaching means projecting from one of the parts in axial alinement with the said longitudinal axis and a current collector secured thereto.

7. In a device of the class described comprising in combination two rigid members extending in the same direction and having a common axis and overlapping spaced surfaces, a tubular body of elastic material engaging the surfaces under compression to yieldingly hold the members in alinement and means to prevent the separation of the members and body.

8. A device for attachment to a trolley pole and to a collector support comprising a member for attachment to the pole, a member for attachment to the support, one member having a cup-shaped receptacle with the other member inserted part way therein and having spaced surfaces within the receptacle and a resilient body interposed between the attaching members and engaging the said surfaces to yieldingly hold the three said parts in a predetermined, spaced and electrically insulated relation.

9. A device for attachment to a trolley pole and to a collector support comprising a member for attachment to the pole, a member for attachment to the support, one member having a cup-shaped receptacle with the other member inserted part way therein and having spaced surfaces within the receptacle and a resilient body interposed between the attaching members and engaging the said surfaces to yieldingly hold the three said parts in a predetermined relation and the members out of contact with each other, and auxiliary means to mechanically interlock one of the attaching members and the resilient member in position without electrically connecting the members.

10. A trolley device comprising in combination, a current collector, a trolley pole, means for securing the pole and collector together comprising a part to be attached to the pole, a part to be attached to the collector and a member of resilient material between the parts to secure the parts together against separation and separate them electrically, and yielding means to electrically connect the parts.

11. A trolley device comprising two members of metal spaced apart, an element of resilient material engaging the members in strong frictional engagement to hold the members out of direct engagement and to increasingly resist the separation of the members under an increasing force tending to separate the members.

12. A trolley device comprising two members of metal spaced apart, an element of resilient material engaging the members in strong frictional engagement to hold the members out of direct engagement and resist the separation of the members under force, and other resilient material to hold the members in separated relation.

13. A trolley device comprising two members of metal spaced apart, an element of resilient material engaging the members in strong frictional engagement to hold the members out of direct engagement and resist the separation of the members under force, other resilient material to hold the members in separated relation and means to electrically connect the members.

14. The combination of a trolley pole, a current collector, means to secure the collector to the pole, resilient and sound insulating means entirely separating the pole and collector and a flexible current-carrying wire forming the only metallic connection between said collector and said pole.

In testimony whereof, I have signed my name to this specification this 29th day of June, 1927.

JOHN ROBERT BLACKHALL.